United States Patent
Radhakrishnan et al.

(10) Patent No.: US 9,054,999 B2
(45) Date of Patent: Jun. 9, 2015

(54) STATIC TRILL ROUTING

(75) Inventors: Chandramouli Radhakrishnan, San Jose, CA (US); Daljeet Singh, Watsonville, CA (US)

(73) Assignee: International Business Machines Corporation, Armonk, NY (US)

(*) Notice: Subject to any disclaimer, the term of this patent is extended or adjusted under 35 U.S.C. 154(b) by 465 days.

(21) Appl. No.: 13/467,081

(22) Filed: May 9, 2012

(65) Prior Publication Data

US 2013/0301642 A1    Nov. 14, 2013

(51) Int. Cl.
*H04L 12/721*    (2013.01)

(52) U.S. Cl.
CPC    *H04L 45/66* (2013.01); *Y02B 60/43* (2013.01)

(58) Field of Classification Search
None
See application file for complete search history.

(56) References Cited

U.S. PATENT DOCUMENTS

2011/0273990 A1    11/2011   Rajagopalan et al.
2011/0280572 A1*   11/2011   Vobbilisetty et al. ........... 398/45

OTHER PUBLICATIONS

IEEE. "IEEE Standard for Local and Metropolitan Area Networks—Station and Media Access Control Connectivity Discovery, 802.1AB" IEEE Std. 802.1AB-2009 (Revision of IEEE Std. 802.1AB-2005) IEEE New York, NY USA. Sep. 17, 2009. Copyright © 2009 by the Institute of Electrical and Electronics Engineers, Inc.

* cited by examiner

*Primary Examiner* — Hassan Phillips
*Assistant Examiner* — Omeed D Rahgozar
(74) *Attorney, Agent, or Firm* — Jinesh Patel; Mark Vallone

(57) ABSTRACT

A method and system for static routing in a TRILL network is disclosed. Routing bridges in the TRILL network use LLDP discovery to identify their next hop routing bridges. A data packet, with an inner header specifying a MAC address of a destination host, is sent by a source host and received by an ingress routing bridge. The ingress routing bridge encapsulates the data packet with a TRILL header and an outer header and sends the data packet to a next hop routing bridge on path to the destination host. The next hop routing bridge determines it is not the egress routing bridge for the data packet and sends the data packet onward to the egress routing bridge. The egress routing bridge decapsulates the data packet and forwards the data packet to the destination host specified in the inner header.

24 Claims, 5 Drawing Sheets

STATIC TRILL ROUTING

FIELD OF THE INVENTION

The present invention relates generally to network routing, and more particularly to a method of static routing within a TRILL network.

BACKGROUND

Transparent Interconnect of Lots of Links (TRILL) is an Internet Engineering Task Force (IETF) protocol that applies network layer routing protocols to the link layer in order to support Layer 2 multipathing. TRILL is designed to replace Spanning Tree Protocol (STP). STP networks establish and maintain a single loop free path among all bridges in a Virtual Local Area Network (VLAN), blocking all alternate paths. This results in inefficient use of available bridges and reduces aggregate bandwidth. TRILL addresses this problem by applying the Intermediate System-to-Intermediate System (IS-IS) Layer 3 routing protocol to Layer 2 devices. This essentially allows Layer 2 devices to route Ethernet frames through multiple paths which provides for higher throughput.

TRILL is implemented by network devices referred to as routing bridges, which are Layer 2 devices that can implement TRILL protocol, perform Layer 2 forwarding, and require little or no configuration. The location of a routing bridge is defined by its Media Access Control (MAC) address. A MAC address, also known as a hardware address or a physical address, is a unique identifier assigned to network interface controllers (NIC), also known as network adapters, for the purpose of communication on a physical network segment. MAC addresses are 12 digit hexadecimal numbers (48 bits in length) normally assigned at the time of manufacture and stored in hardware, read-only memory, or some other firmware mechanism. A network node, such as a routing bridge, may have multiple NICs, in which case, each NIC will have its own unique MAC address. A host cannot determine from the MAC address of another host whether that host is on the same network segment as the sending host, or on another network segment bridged to that network segment.

Typically, TRILL devices (routing bridges) run a link state protocol amongst themselves. The link state routing protocol typically used in current Layer 2 TRILL networks is Intermediate System to Intermediate System (IS-IS). A link state protocol is one in which connectivity information is broadcast to all the routing bridges in the network, such that each routing bridge is aware of all other routing bridges and the connectivity between them. This connectivity information enables routing bridges to compute pair-wise optimal or least cost paths for unicast, and to calculate distribution trees for delivery of frames either to destinations whose location are unknown or to multicast/broadcast groups.

IS-IS is designed to move information efficiently within a computer network. IS-IS operates by flooding link state information throughout a network of routing bridges. Each routing bridge independently collects the flooded network information and builds a database of the network's topology. IS-IS uses Dijkstra's algorithm to compute the optimal path through the network. Subsequent data packets are then forwarded based on the computed optimal path through the network to the destination.

For example, a frame is forwarded through a campus network utilizing the IS-IS link state protocol in the following manner. Initially, a unicast frame enters the campus network at the ingress routing bridge. The frame arrives with an inner header which contains the MAC addresses of the frame's source host and destination host (i.e., the intended recipient of the frame). The ingress routing bridge encapsulates the frame and adds a new TRILL header which includes the "nicknames" of the ingress routing bridge and the egress routing bridge, which is connected to the VLAN of the destination host.

The TRILL header includes a 6-bit decrementing hop count, the egress routing bridge nickname and the ingress routing bridge nickname. After the TRILL header is added, the ingress routing bridge determines the next hop routing bridge along the optimal path moving to the final destination, adds an outer header which includes the MAC address of the ingress routing bridge and the MAC address of the next hop routing bridge, and forwards the frame to the next hop routing bridge.

Once the next hop routing bridge receives the frame, it compares the egress routing bridge nickname in the TRILL header with its own. If the routing bridge determines it is not the egress routing bridge (i.e., the nickname in the TRILL header does not match its own), it determines the next step along the least cost path to the final destination as described above and forwards the frame onward.

This step is repeated by every routing bridge along the optimal path until the frame reaches the egress routing bridge. The egress routing bridge strips off the outer and TRILL header, decapsulates the frame and forwards the frame to the MAC address of the destination host specified in the inner header.

Link Layer Discovery Protocol (LLDP) is a form of neighbor discovery protocol. The primary difference between LLDP and IS-IS is that routing bridges using LLDP advertise their locations only to their neighboring or next hop routing bridges, as opposed to learning the entire network topology as in IS-IS systems. Each routing bridge collects the advertised next hop location information to compile an LLDP database containing the MAC addresses for each of its next hop routing bridges.

SUMMARY

Embodiments of the present invention provide a system, method, and program product for static routing in a TRILL network. The routing bridge receives routing instructions identifying a next hop routing bridge that corresponds to each egress routing bridge in the TRILL network. The routing bridge receives a data packet with an inner header containing a MAC address of a destination host for the data packet. The routing bridge determines whether it is an ingress routing bridge. Responsive to determining the routing bridge is the ingress routing bridge, the routing bridge identifies the name of an egress routing bridge and encapsulates the data packet with a TRILL header containing the name of the ingress routing bridge and the name of the egress routing bridge. The routing bridge then determines whether it is the egress routing bridge. Responsive to determining the routing bridge is the egress routing bridge, the routing bridge decapsulates the data packet and forwards the data packet to the destination host located at the MAC address specified in the inner header. Responsive to determining the routing bridge is not the egress routing bridge, the routing bridge identifies a MAC address for the next hop routing bridge, encapsulates the data packet with an outer header containing the MAC address of the routing bridge and the MAC address for the next hop routing bridge, and sends the data packet to the MAC address for the next hop routing bridge.

In certain embodiments, the routing bridge determines whether it is the ingress routing bridge by checking if the data packet is encapsulated with a TRILL header.

In certain embodiments, the routing bridge receives a TRILL forwarding database containing a VLAN ID for each VLAN linked to the TRILL network, the MAC address for each host contained within each VLAN, and the egress routing bridge linked to each VLAN.

In certain embodiments, the routing bridge identifies the name of the egress routing bridge by checking the TRILL forwarding database to determine the egress routing bridge that corresponds to the MAC address of the destination host specified in the inner header.

In certain embodiments, the routing bridge determines if the routing bridge is the egress routing bridge by comparing the name of the routing bridge with the name of the egress routing bridge in the TRILL header.

In certain embodiments, if the routing bridge is the ingress routing bridge, the decapsulating includes removing the TRILL header. In certain embodiments, if the routing bridge is not the ingress routing bridge, the decapsulating includes removing the outer header and the TRILL header.

In certain embodiments, the routing bridge receives location information from its next hop routing bridges and creates an LLDP database using the location information.

In certain embodiments, the routing bridge identifies the MAC address for the next hop routing bridge by cross-referencing the routing instructions against an LLDP database.

DETAILED DESCRIPTION

Embodiments of the present invention will now be described in detail with reference to the accompanying Figures.

Figure 1:
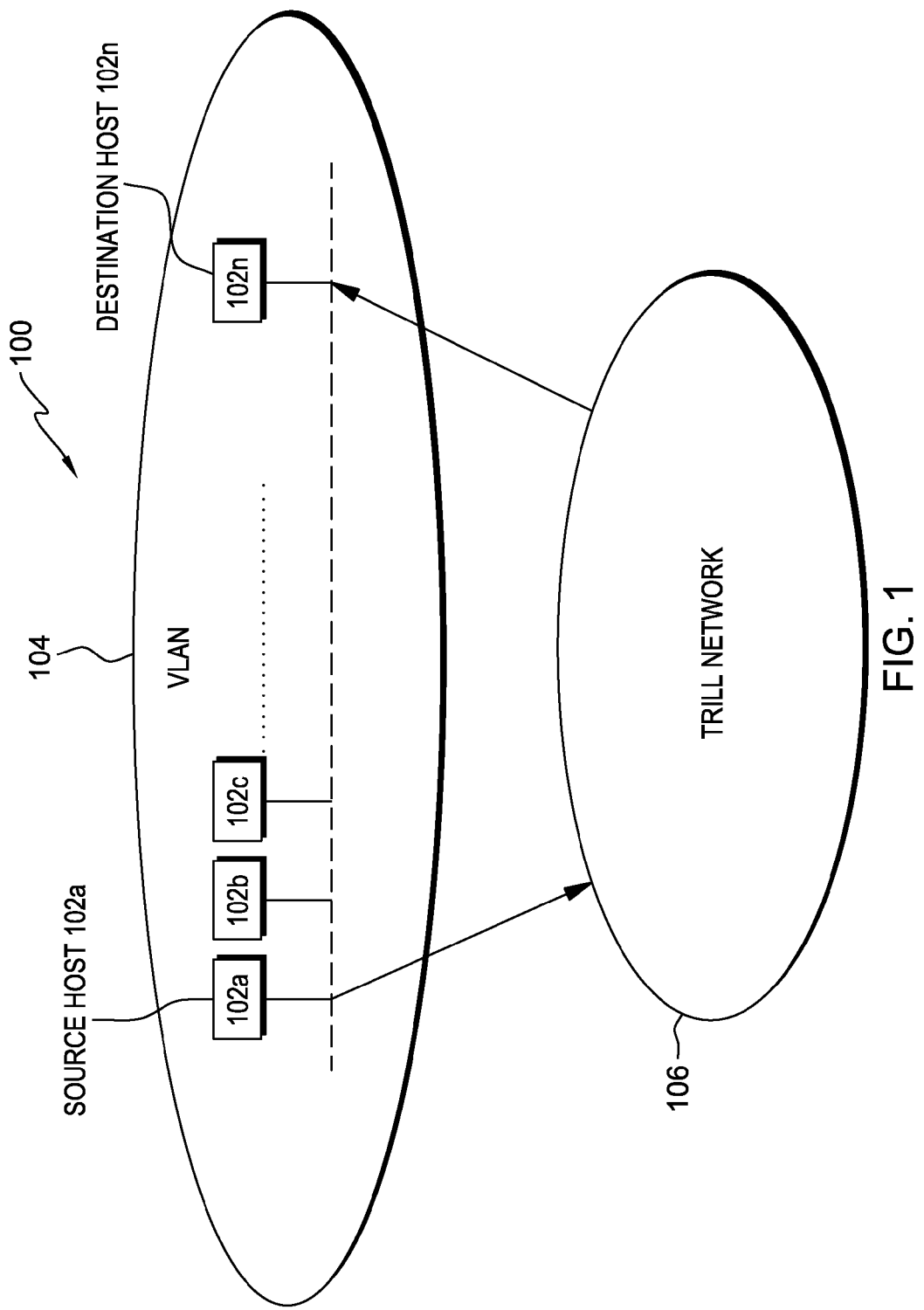
FIG. 1 illustrates a static TRILL routing system in accordance with an embodiment of the invention.

FIG. 1 illustrates static TRILL routing system 100 in accordance with an embodiment of the invention. Static TRILL routing system 100 includes VLAN 104 which is connected to TRILL network 106. While FIG. 1 illustrates VLAN 104 as the only VLAN in static TRILL routing system 100, other embodiments may include VLANs connected to TRILL network 106.

VLAN 104 includes hosts 102a through 102n. In a preferred embodiment, VLAN 104 is a virtual local area network. In other embodiments, VLAN 104 may be implemented as an intranet, a local area network (LAN), or a wide area network (WAN). In the preferred embodiment, VLAN 104 includes a combination of connections and protocols that support communications between each of hosts 102a through 102n and TRILL network 106 in accordance with an embodiment of the invention. In general, VLAN 104 is a group of hosts 102a through 102n, which may be located anywhere, and communicate with each other via TRILL network 106. Each of hosts 102a through 102n in VLAN 104 can be both a source of communications entering TRILL network 106, as well as a destination for communications leaving TRILL network 106.

Each of hosts 102a through 102n may be a desktop computer, a notebook, a laptop computer, a tablet computer, a handheld device, a smart-phone, a thin client, or any other electronic device or computing system capable of receiving inputs, executing computer program instructions, and communicating with another computing system via TRILL network 106. In general, each of hosts 102a through 102n is any programmable device that includes a network interface that allows for network connectivity. Hosts 102a through 102n will be described in more detail with reference to FIG. 5.

In general, TRILL network 106 includes one or more network devices that implement the TRILL protocol. The network devices are referred to as routing bridges. The routing bridges in TRILL network 106 are used to connect hosts 102a through 102n in VLAN 104 with each other at the data link layer (Layer 2). In the preferred embodiment, TRILL network 106 includes at least two routing bridges. TRILL network 106 will be described in more detail with reference to FIG. 2.

Figure 2:
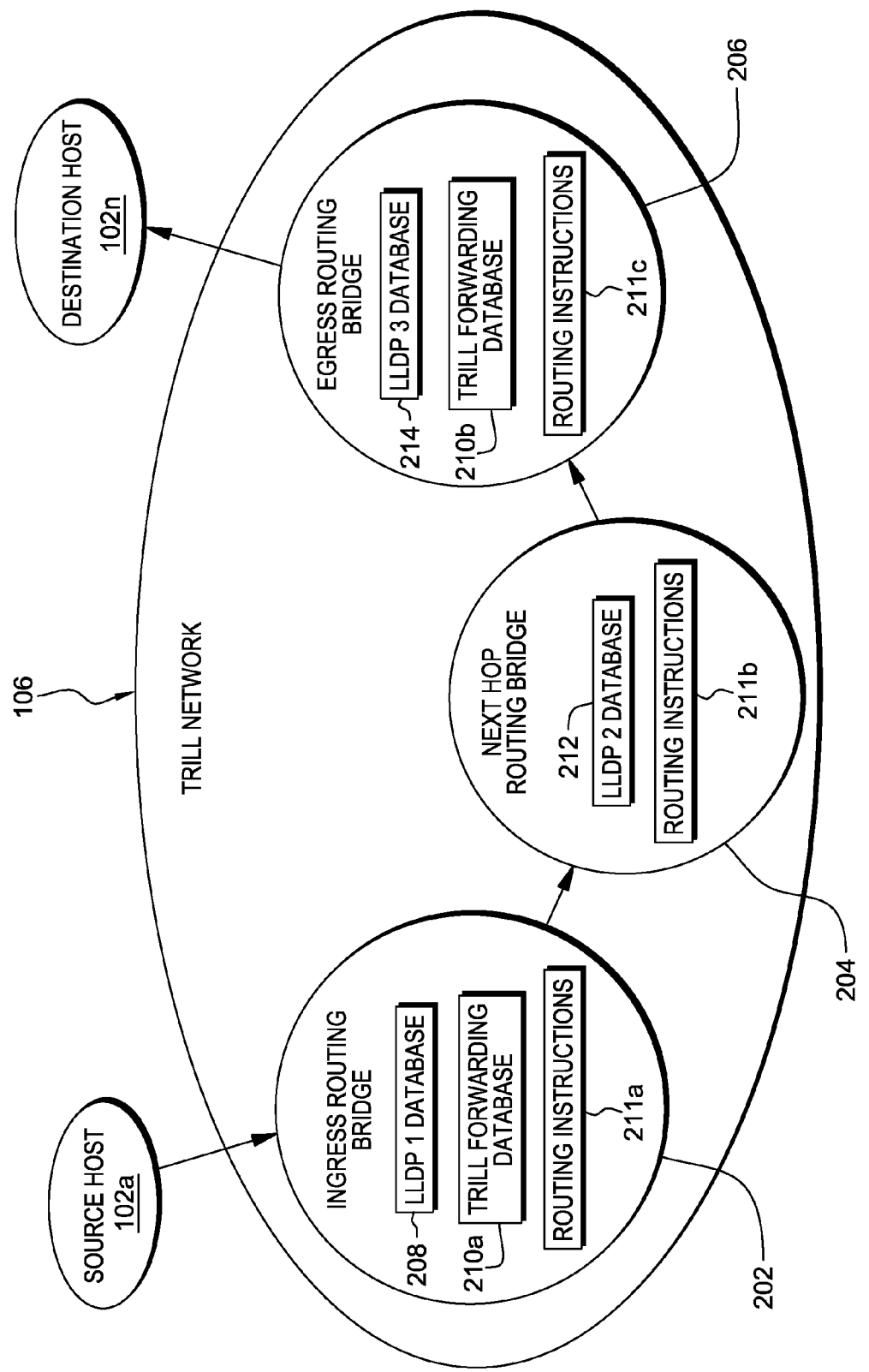
FIG. 2 illustrates a TRILL network in accordance with an embodiment of the invention.

FIG. 2 illustrates TRILL network 106 in accordance with an embodiment of the invention. TRILL network 106 includes ingress routing bridge 202, next hop routing bridge 204, and egress routing bridge 206. It is understood that the system shown in FIG. 2 is only an example and the embodiments described herein may be implemented in systems having different network topologies and network devices, without departing from the scope of the invention. In the discussion below, the operation of TRILL network 106 will be explained in the context of the transmission of a data packet originating at source host 102a and destined for destination host 102n. This explanatory example is not limiting, and it should be understood that TRILL network 106 can operate in different ways in various embodiments.

Ingress routing bridge 202 includes TRILL forwarding database 210a, routing instructions 211a, and LLDP 1 database 208. In general, ingress routing bridge 202 is a network device capable of implementing the TRILL protocol. More specifically, ingress routing bridge 202 is an edge routing bridge that links to source host 102a in VLAN 104. Generally, an edge routing bridge is any routing bridge in TRILL network 106 that links to a host in a VLAN external to TRILL network 106. Routing bridges that do not link to a host in a VLAN external to TRILL network 106 may be referred to herein as transit routing bridges (e.g., next hop routing bridge 204, in one embodiment). In the preferred embodiment, ingress routing bridge 202 receives a data packet from source host 102a, encapsulates the data packet with a TRILL header and an outer header, and forwards the data packet to next hop routing bridge 204, as described in detail below.

TRILL forwarding database 210a of ingress routing bridge 202 includes a VLAN ID for each VLAN in static TRILL routing system 100, the MAC address for each host contained within each VLAN, and the egress routing bridge linked to each host. More specifically, TRILL forwarding database 210a includes the VLAN ID for VLAN 104, the MAC address for each of hosts 102a through 102n in VLAN 104, and the egress routing bridge linked to each of hosts 102a through 102n. In the preferred embodiment, ingress routing bridge 202 uses TRILL forwarding database 210a to determine the appropriate egress routing bridge for the received data packet, and to create the TRILL header on the received data packet prior to forwarding it to another routing bridge within TRILL network 106. To do so, ingress routing bridge 202 cross references the MAC address of the destination host in the data packet's inner header against TRILL forwarding database 210a in order to determine the egress routing bridge, which in the present example is egress routing bridge 206. In general, TRILL forwarding databases are sent or configured in all edge routing bridges, which in the preferred embodiment includes ingress routing bridge 202 and egress routing bridge 206. Having determined the appropriate egress routing bridge, ingress routing bridge 202 encapsulates the data packet in a TRILL header which contains the nickname of ingress routing bridge 202 and the newly determined egress routing bridge, egress routing bridge 206.

Routing instructions 211a of ingress routing bridge 202 includes information instructing ingress routing bridge 202 which next hop routing bridge to use to reach a specified egress routing bridge. In the preferred embodiment, TRILL network 106 includes only next hop routing bridge 204, but in other embodiments, ingress routing bridge 202 can be linked to numerous next hop routing bridges. In the preferred embodiment, routing instructions 211a instruct ingress routing bridge 202 to use next hop routing bridge 204 as the next hop on the path to egress routing bridge 206.

LLDP 1 database 208 of ingress routing bridge 202 includes the MAC addresses and nicknames of all next hop routing bridges linked to ingress routing bridge 202. In the preferred embodiment, ingress routing bridge 202 checks LLDP 1 database 208 to identify the MAC address of the next hop routing bridge instructed, as discussed above, by routing instructions 211a, which is next hop routing bridge 204. Having determined the MAC address of the next hop routing bridge, ingress routing bridge 202 encapsulates the data packet in an outer header containing the MAC address of ingress routing bridge 202 and the MAC address of next hop routing bridge 204. Thus, as discussed above, after receiving the data packet from source host 102a, ingress routing bridge 202 has used TRILL forwarding database 210a, routing instructions 211a, and LLDP 1 database 208 to encapsulate the data packet in a TRILL header and further in an outer header. Ingress routing bridge 202 then forwards the data packet to next hop routing bridge 204.

The data packet is received by next hop routing bridge 204, which decapsulates the outer header, and then performs analysis on the revealed TRILL header. Next hop routing bridge 204 includes routing instructions 211b and LLDP 2 database 212. In general, next hop routing bridge 204 is a network device capable of implementing TRILL. Because next hop routing bridge 204 is not directly linked to a VLAN external to TRILL network 106, it is regarded as a transit routing bridge. While next hop routing bridge 204 is shown in FIG. 2 as the only transit routing bridge, it is understood that this represents a single embodiment. In other embodiments, there may be a multitude of next hop routing bridges between ingress routing bridge 202 and egress routing bridge 206. In the preferred embodiment, next hop routing bridge 204 is capable of receiving a data packet from ingress routing bridge 202, determining a subsequent next hop routing bridge or egress routing bridge and forwarding the data packet to the subsequent routing bridge, which in the preferred embodiment is egress routing bridge 206, as shown in FIG. 2.

Routing instructions 211b includes information instructing next hop routing bridge 204 which next hop routing bridge to use to reach the egress routing bridge specified in the TRILL header of the received data packet. In the preferred embodiment, routing instructions 211b instructs next hop routing bridge 204 to forward the received data packet to egress routing bridge 206. Egress routing bridge 206 is the final hop or egress routing bridge for the data packet being forwarded to destination host 102n in VLAN 104.

LLDP 2 database 212 includes the MAC addresses and nicknames of all routing bridges linked to next hop routing bridge 204. In the preferred embodiment, next hop routing bridge 204 checks LLDP 2 database 212 to identify the MAC address for the next hop routing bridge specified in routing instructions 211b, which is egress routing bridge 206. Thus, as discussed above, after receiving the data packet from ingress routing bridge 202, next hop routing bridge 204 has decapsulated the outer header from the data packet, and used routing instructions 211b and LLDP 2 database 212 to reencapsulate the data packet in a new outer header containing the MAC address of next hop routing bridge 204 and egress routing bridge 206. Next hop routing bridge 204 then forwards the data packet to egress routing bridge 206.

The data packet is received by egress routing bridge 206, which decapsulates the outer header, and then performs analysis on the revealed TRILL header. Egress routing bridge 206 includes TRILL forwarding database 210b, routing instructions 211c, and LLDP 3 database 214. In general, egress routing bridge 206 is a network device capable of implementing the TRILL protocol. More specifically, egress routing bridge 206 is an edge routing bridge that links to destination host 102n in VLAN 104. In the preferred embodiment, egress routing bridge 206 receives a data packet from next hop routing bridge 204, removes the outer header, determines itself to be the egress routing bridge, decapsulates the data packet of the TRILL header and forwards the data packet to the MAC address of the destination host, which is destination host 102n, specified in the inner header of the data packet.

TRILL forwarding database 210b of egress routing bridge 206 includes a VLAN ID for each VLAN in static TRILL routing system 100, the MAC address for each host contained within each VLAN, and the egress routing bridge linked to each VLAN. More specifically, TRILL forwarding database 210b includes the VLAN ID for VLAN 104, the MAC address for each of hosts 102a through 102n in VLAN 104, and the egress routing bridge linked to each of hosts 102a through 102n. In the preferred embodiment, egress routing bridge 206 uses TRILL forwarding database 210b to determine the appropriate egress routing bridge for a received data packet, and to create the TRILL header on a data packet received from destination host 102n in VLAN 104 (recall that, as stated above, destination host 102n can be both a destination for communications leaving TRILL network 106, as well as a source of communications entering TRILL network 106). Egress routing bridge 206 cross references the MAC address of the destination host specified in the received data packet's inner header against TRILL forwarding database 210b in order to determine the egress routing bridge. In the preferred embodiment, for a data packet originating from source host 102a destined for destination host 102n, TRILL forwarding database 210b is not used because egress routing bridge 206 is the egress routing bridge or final hop routing bridge for destination host 102n.

Routing instructions 211c includes information instructing egress routing bridge 206 which next hop routing bridge to use to reach a specified egress routing bridge. In the preferred embodiment, routing instructions 211c are not used, because egress routing bridge 206 has determined that it, itself, is the final hop routing bridge to destination host 102n in VLAN 104.

LLDP 3 database 214 includes the MAC addresses and nicknames of all next hop routing bridges linked to egress routing bridge 206. In the preferred embodiment, egress routing bridge 206 checks LLDP 3 database 214 to identify the MAC address of the next hop routing bridge specified in routing instructions 211c. However, in the preferred embodiment, since egress routing bridge 206 is the final hop routing bridge, no next hop determinations are required and LLDP 3 database 214 is not used. Thus, as discussed above, after receiving the data packet from next hop routing bridge 204, egress routing bridge 206 decapsulates the outer header from the data packet, and checks the TRILL header to determine that it, itself, is the appropriate egress routing bridge for the data packet. Egress routing bridge 206 then decapsulates the TRILL header from the data packet and forwards the data packet to destination host 102n in VLAN 104.

As discussed in detail above, FIG. 2 illustrates TRILL network 106, according to one embodiment of the invention. In other embodiments, TRILL network 106 may include more or fewer next hop/transit routing bridges, and edge routing bridges. While in the example discussed above, egress routing bridge 206 functions as the final hop or appropriate egress routing bridge for a data packet transmitted from source host 102a to destination host 102n, alternatively, egress routing bridge 206 may function as the ingress routing bridge for a transmission from destination host 102n to source host 102a in VLAN 104. In this alternative, TRILL forwarding database 210b is used to determine the appropriate egress routing bridge as described above, while LLDP 3 database 214 and routing instructions 211c are used to determine the next hop routing bridge on path to the egress routing bridge, which in this alternative would be ingress routing bridge 202.

Figure 3:
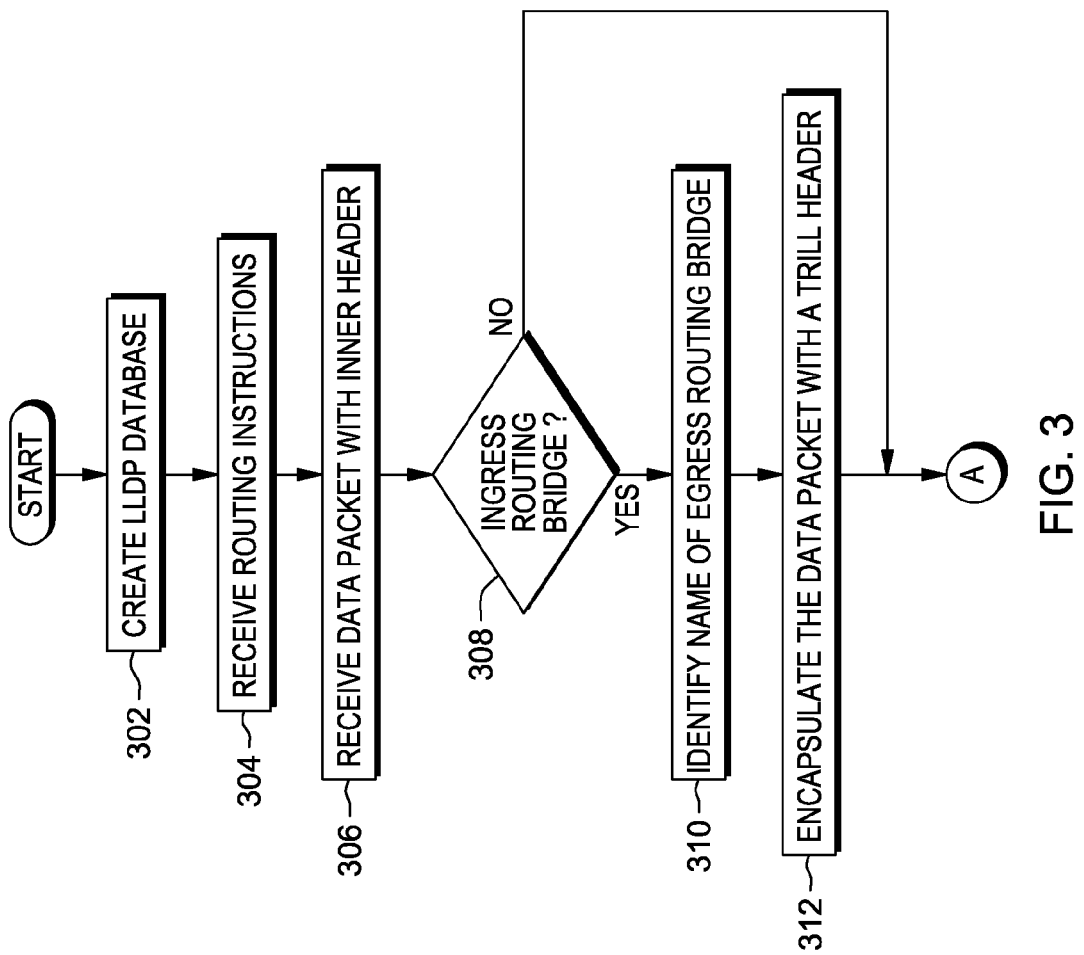
FIG. 3 is a flowchart illustrating the steps of an ingress routing bridge determination conducted by each routing bridge in the TRILL network of FIG. 2, in accordance with an embodiment of the invention.

FIG. 3 is a flowchart illustrating an ingress routing bridge determination conducted by each routing bridge in the TRILL network, in accordance with a preferred embodiment of the invention. In the preferred embodiment, the routing bridge receives location information from all of its neighbors or next hop routing bridges and creates an LLDP database for the routing bridge (step 302). For example, with regards to FIG. 2, ingress routing bridge 202 gathers location information from next hop routing bridge 204, and creates LLDP 1 database 208. In the preferred embodiment, the received location information includes the MAC addresses and Router Bridge IDs or "nicknames" of all next hop routing bridges for the receiving routing bridge. For example, LLDP 1 database 208, located in ingress routing bridge 202, would include the MAC address and nickname of next hop routing bridge 204.

The routing bridge then receives routing instructions from a user (step 304). The routing instructions identify the preferred next hop routing bridge that corresponds to each egress routing bridge in the TRILL network. In the preferred embodiment, the routing instructions are configured directly on each routing bridge and are specific to that routing bridge. For example, with regard to FIG. 2, routing instructions 211a would be directly configured onto ingress routing bridge 202, and would identify next hop routing bridge 204 as the next hop to egress routing bridge 206. Therefore, even if there are other next hop paths from ingress routing bridge 202 to egress routing bridge 206, ingress routing bridge 202 will choose next hop routing bridge 204 as the next hop. In another embodiment, the routing instructions are flooded from a user using a host external to TRILL network 106, or from a control server external to TRILL network 106, such as one or more of hosts 102a through 102n in VLAN 104, into TRILL network 106. In this embodiment, the routing instructions are not specific to an individual routing bridge. Instead, the routing instructions identify the user-specified next hop routing bridges for all routing bridges in the TRILL network. The routing instructions are flooded to all routing bridges in the TRILL network with a hop count equal to the amount of routing bridges in the TRILL network. For example, with regard to FIG. 2, the routing instructions are flooded into TRILL network 106 with an onward hop count of 3, since there are 3 network devices in TRILL network 106. Generally, the hop count of the routing instructions can be set to reduce unnecessary flooding while ensuring that every routing bridge receives the routing instructions during the flood.

The routing bridge then receives a data packet containing an inner header from a host (step 306). In the preferred embodiment, the inner header specifies the MAC address of source host 102a and the MAC address of destination host 102n. In another embodiment, the VLAN ID of VLAN 104 is also included in a separate header, or a separate portion of the inner header, called an 802.1Q header.

After receipt of the data packet, the routing bridge determines if it is the ingress routing bridge by checking to see if the data packet is encapsulated with a TRILL header (decision 308). If it is not encapsulated with a TRILL header, then the routing bridge is the ingress routing bridge. If the data packet is encapsulated with a TRILL header, the routing bridge is not the ingress routing bridge. If the routing bridge is not the ingress routing bridge, the routing bridge goes on to determine if it is the egress routing bridge, explained in detail with regard to FIG. 4 below (decision 402). If the routing bridge is the ingress routing bridge, it goes on to determine the nickname of the egress routing bridge for the data packet (step 310).

Ingress routing bridge 202 determines the nickname of the egress routing bridge by checking the MAC address of destination host 102n against TRILL forwarding database 210a (step 310). TRILL forwarding database 210a specifies an egress routing bridge for each host linked to TRILL network 106. In the preferred embodiment, the determined egress routing bridge for destination host 102n is egress routing bridge 206.

Ingress routing bridge 202 then encapsulates the inner header with a TRILL header (step 312). The TRILL header contains the nickname of the ingress routing bridge and the newly determined egress routing bridge. In the preferred embodiment, the TRILL header contains the nickname of ingress routing bridge 202 and egress routing bridge 206.

Figure 4:
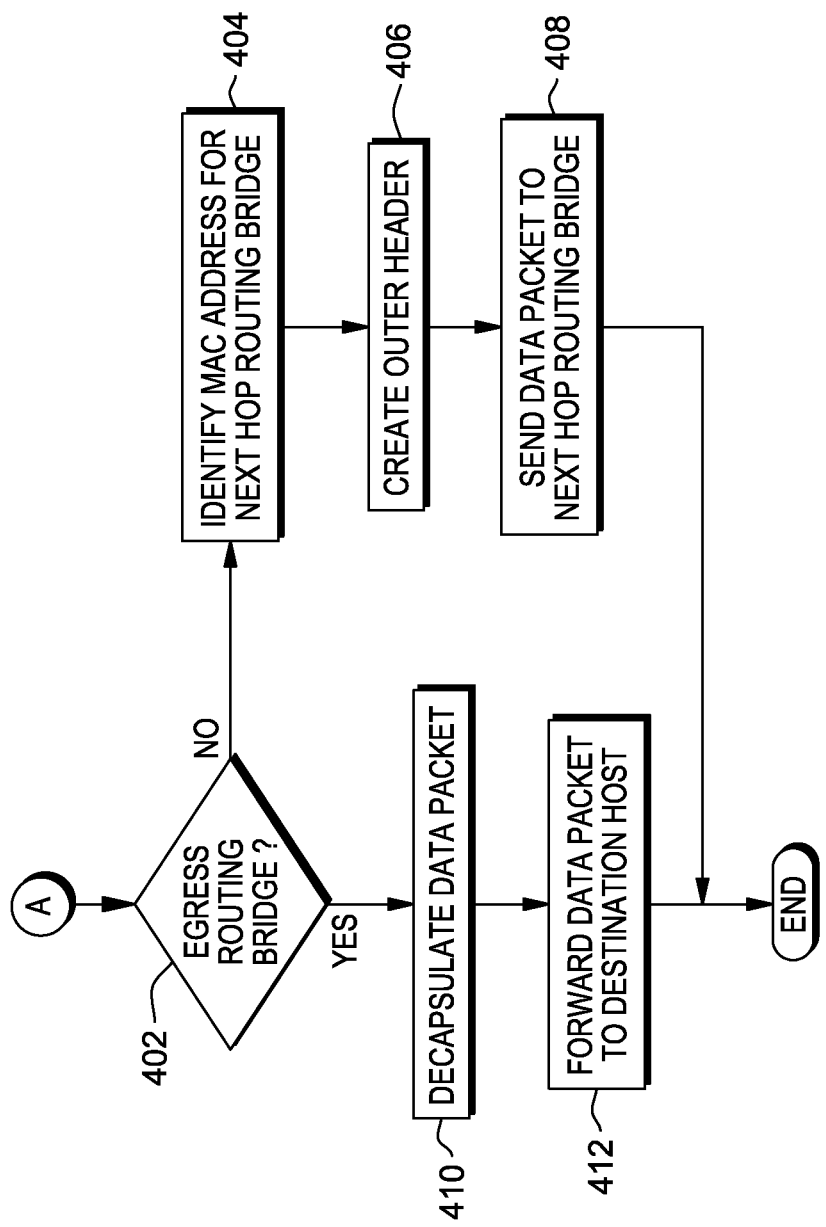
FIG. 4 is a flowchart illustrating the steps of an egress routing bridge determination conducted by each routing bridge in the TRILL network of FIG. 2, in accordance with an embodiment of the invention.

FIG. 4 is a flowchart illustrating an egress routing bridge determination conducted by each routing bridge in the TRILL network, in accordance with a preferred embodiment of the invention. The routing bridge determines if it is the egress routing bridge by checking to see if the nickname of the egress routing bridge specified in the TRILL header, created by ingress routing bridge 202, matches its own (decision 402). If the routing bridge's nickname matches the nickname of the egress routing bridge specified in the TRILL header, the routing bridge is the egress routing bridge and can move onto decapsulating the data packet (step 410). If the routing bridge's nickname does not match the nickname of the egress routing bridge specified in the TRILL header, the routing bridge is not the egress routing bridge.

If the routing bridge is determined not to be the egress routing bridge then the routing bridge identifies the MAC address for the next hop routing bridge (step 404). In the preferred embodiment, the routing bridge identifies the MAC address for the next hop routing bridge by consulting the routing instructions, configured or flooded into the routing bridge as described above, to determine the nickname of the next hop routing bridge it has been instructed to forward the data packet to. The routing bridge then identifies the MAC address for the next hop routing bridge by checking the nickname of the next hop routing bridge against its LLDP database. For example, with regard to FIG. 2, ingress routing bridge 202 consults routing instructions 211a to determine that the instructed next hop routing bridge is next hop routing bridge 204. Ingress routing bridge 202 identifies the MAC address for next hop routing bridge 204 by checking LLDP 1 database 208.

In another embodiment, the routing instructions contain both the nickname and MAC address of the instructed next hop routing bridge. Therefore, there is no need for the routing bridge to consult the LLDP database to determine the MAC address of the next hop routing bridge. For example, with regard to FIG. 2, routing instructions 211a on ingress routing bridge 202 contains the nickname of next hop routing bridge 204 as well as the MAC address for next hop routing bridge 204. Therefore, ingress routing bridge 202 has no need to consult with LLDP 1 database 208.

The routing bridge then creates an outer header on the data packet (step 406). In the preferred embodiment, the outer header contains the MAC address of the routing bridge and the MAC address of its next hop routing bridge determined in step 404. For example, with regard to FIG. 2, ingress routing bridge 202 creates an outer header on the data packet containing the MAC address of ingress routing bridge 202 and the MAC address of next hop routing bridge 204.

In the preferred embodiment, the routing bridge then sends the data packet to the next hop routing bridge determined in step 404 (step 408). For example, with regard to FIG. 2, ingress routing bridge 202 sends the data packet to next hop routing bridge 204.

In a preferred embodiment, if the routing bridge is determined to be the egress routing bridge (decision 402), the routing bridge strips off the TRILL and outer headers and decapsulates the data packet (step 410). For example, with regard to FIG. 2, when egress routing bridge 206 determines that it is the egress routing bridge for the data packet destined for destination host 102n, egress routing bridge 206 strips off the outer header, created by next hop routing bridge 204, and the TRILL header, created by ingress routing bridge 202, and decapsulates the data packet.

In another embodiment, when the egress routing bridge is also the ingress routing bridge, the routing bridge strips off the TRILL header only. In this embodiment, there is no outer header on the data packet because the data packet never reaches a next hop routing bridge or passes through more than one routing bridge. For example, if ingress routing bridge 202 determines it is also the egress routing bridge for the data packet, ingress routing bridge 202 will strip off the TRILL header, created by ingress routing bridge 202, and decapsulate the data packet. In one embodiment, when the egress routing bridge is also the ingress routing bridge, the routing bridge may perform an early check and thereby avoid creating the TRILL header altogether. The outer header is never created by ingress routing bridge 202 or next hop routing bridge 204 because no next hop was required for the data packet to reach the egress routing bridge, which is ingress routing bridge 202.

In the preferred embodiment, the egress routing bridge then forwards the data packet to the MAC address of the destination host specified in the inner header (step 412). For example, with regards to FIG. 2, egress routing bridge 206 checks the inner header of the decapsulated data packet to determine the MAC address of destination host 102n. Egress routing bridge 206 then forwards the decapsulated data packet to the specified MAC address of destination host 102n located in VLAN 104.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 5:
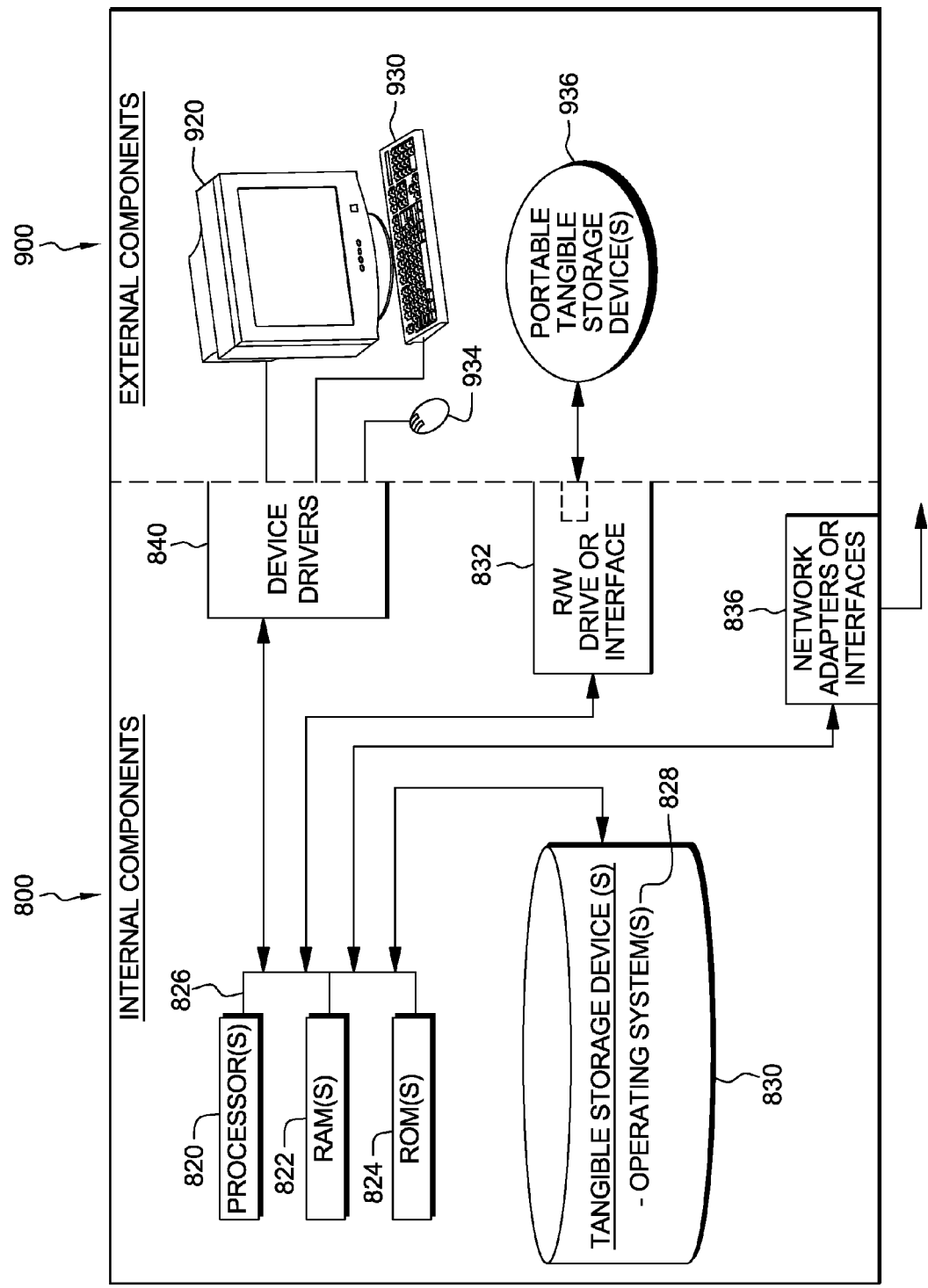
FIG. 5 shows a block diagram of the hardware and software within the hosts and routing bridges of FIG. 1.

FIG. 5 shows a block diagram of the components of a data processing system 800, 900, in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Hosts 102a through 102n, ingress routing bridge 202, next hop routing bridge 204, and egress routing bridge 206 each include respective sets of internal components 800 and external components 900 illustrated in FIG. 5. Each of the respective sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs in hosts 102a through 102n; LLDP 1 database 208, TRILL forwarding database 210a, routing instructions 211a in ingress routing bridge 202; LLDP 2 database 212 and routing instructions 211b in next hop routing bridge 204; and LLDP 3 database 214, TRILL forwarding database 210b, routing instructions 211c in egress routing bridge 206 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs in hosts 102a through 102n; LLDP 1 database 208, TRILL forwarding database 210a, routing instructions 211a in ingress routing bridge 202; LLDP 2 database 212 and routing instructions 211b in next hop routing bridge 204; and LLDP 3 database 214, TRILL forwarding database 210b, routing instructions 211c in egress routing bridge 206 can be stored on one or more of the respective portable computer-readable tangible storage devices 936, read via the respective R/W drive or interface 832 and loaded into the respective hard drive 830.

Each set of internal components 800 also includes network adapters or interfaces 836 such as TCP/IP adapter cards, wireless wi-fi interface cards, or 3G or 4G wireless interface cards or other wired or wireless communication links. The programs in hosts 102*a* through 102*n*; LLDP 1 database 208, TRILL forwarding database 210*a*, routing instructions 211*a* in ingress routing bridge 202; LLDP 2 database 212 and routing instructions 211*b* in next hop routing bridge 204; and LLDP 3 database 214, TRILL forwarding database 210*b*, routing instructions 211*c* in egress routing bridge 206 can be downloaded to respective computers hosts 102*a* through 102*n*, ingress routing bridge 202, next hop routing bridge 204, and egress routing bridge 206 from an external computer via a network (for example, the Internet, a local area network or other, wide area network) and respective network adapters or interfaces 836. From the network adapters or interfaces 836, programs in hosts 102*a* through 102*n*; LLDP 1 database 208, TRILL forwarding database 210*a*, routing instructions 211*a* in ingress routing bridge 202; LLDP 2 database 212 and routing instructions 211*b* in next hop routing bridge 204; and LLDP 3 database 214, TRILL forwarding database 210*b*, routing instructions 211*c* in egress routing bridge 206 are loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method for static routing in a Transparent Interconnection of Lots of Links (TRILL) network, the method comprising the steps of:
    a routing bridge receiving location information from one or more neighboring routing bridges of the routing bridge;
    the routing bridge utilizing the received location information to create a Link Layer Discovery Protocol (LLDP) database which includes nicknames and media access control (MAC) addresses for the one or more neighboring routing bridges of the routing bridge;
    the routing bridge receiving routing instructions identifying a neighboring routing bridge of the one or more neighboring routing bridges that corresponds to each routing bridge in the TRILL network that connects to a destination host;
    the routing bridge receiving a data packet with an inner header containing a MAC address of a destination host for the data packet;
    the routing bridge determining whether the routing bridge is a routing bridge serving as an entry point for the data packet into the TRILL network;
    responsive to determining the routing bridge is the routing bridge serving as an entry point for the data packet into the TRILL network, the routing bridge utilizing a TRILL forwarding database to identify a name of a routing bridge that connects to the destination host for the data packet, and encapsulating the data packet with a TRILL header containing a name of the routing bridge and the name of the routing bridge that connects to the destination host for the data packet;
    the routing bridge determining whether the routing bridge is the routing bridge that connects to the destination host for the data packet;
    responsive to determining the routing bridge is the routing bridge that connects to the destination host for the data packet, the routing bridge decapsulating the data packet and forwarding the data packet to the destination host located at the MAC address specified in the inner header; and
    responsive to determining the routing bridge is not the routing bridge that connects to the destination host for the data packet, the routing bridge utilizing the LLDP database and routing instructions to identify a MAC address for a relevant neighboring routing bridge of the one or more neighboring routing bridges, encapsulating the data packet with an outer header containing the MAC address of the routing bridge and the MAC address for the relevant neighboring routing bridge, and sending the data packet to the MAC address for the relevant neighboring routing bridge.

2. The method of claim 1, wherein the routing bridge determines whether the routing bridge is the routing bridge serving as an entry point for the data packet into the TRILL network by checking if the data packet is encapsulated with a TRILL header.

3. The method of claim 1, further comprising the step of:
    the routing bridge receiving a TRILL forwarding database containing a virtual local area network (VLAN) ID for each VLAN linked to the TRILL network, the MAC address for each host contained within each VLAN, and the routing bridge linked to each VLAN.

4. The method of claim 3, wherein the routing bridge identifies the name of the routing bridge that connects to the destination host for the data packet by checking the TRILL forwarding database to determine the routing bridge that corresponds to the MAC address of the destination host specified in the inner header.

5. The method of claim 1, wherein the routing bridge determines if the routing bridge is the routing bridge that connects to the destination host for the data packet by comparing the name of the routing bridge with the name of the routing bridge that connects to the destination host for the data packet specified in the TRILL header.

6. The method of claim 1, wherein if the routing bridge is the routing bridge serving as the entry point for the data packet into the TRILL network, the decapsulating includes removing the TRILL header.

7. The method of claim 1, wherein if the routing bridge is not the routing bridge serving as the entry point for the data packet into the TRILL network, the decapsulating includes removing the outer header and the TRILL header.

8. The method of claim 1, wherein the routing bridge identifies the MAC address for the relevant neighboring routing bridge by cross-referencing the routing instructions against the LLDP database.

9. A computer program product for static routing in a Transparent Interconnection of Lots of Links (TRILL) network, the computer program product comprising:
one or more computer-readable storage devices and program instructions stored on at least one of the one or more computer-readable storage devices, the stored program instructions comprising:
program instructions to receive location information from one or more neighboring routing bridges of a routing bridge;
program instructions to utilize the received location information to create a Link Layer Discovery Protocol (LLDP) database which includes nicknames and media access control (MAC) addresses for the one or more neighboring routing bridges of the routing bridge;
program instructions to receive routing instructions identifying a neighboring routing bridge of the one or more neighboring routing bridges that corresponds to each routing bridge in the TRILL network that connects to a destination host;
program instructions to receive a data packet with an inner header containing a MAC address of a destination host for the data packet;
program instructions to determine whether a routing bridge is a routing bridge serving as an entry point for the data packet into the TRILL network;
program instructions to, in response to determining the routing bridge is the routing bridge serving as an entry point for the data packet into the TRILL network, utilize a TRILL forwarding database to identify the name of a routing bridge that connects to the destination host for the data packet, and encapsulate the data packet with a TRILL header containing the name of the routing bridge and the name of the routing bridge that connects to the destination host for the data packet;
program instructions to determine whether the routing bridge is the routing bridge that connects to the destination host for the data packet;
program instructions to, in response to determining the routing bridge is the routing bridge that connects to the destination host for the data packet, decapsulate the data packet and forward the data packet to the destination host located at the MAC address specified in the inner header; and
program instructions to, in response to determining the routing bridge is not the routing bridge that connects to the destination host for the data packet, utilize the LLDP database and routing instructions to identify the MAC address for a relevant neighboring routing bridge of the one or more neighboring routing bridges, encapsulate the data packet with an outer header containing the MAC address of the routing bridge and the MAC address for the relevant neighboring routing bridge, and send the data packet to the MAC address for the relevant neighboring routing bridge.

10. The computer program product of claim 9, wherein the program instructions to determine whether the routing bridge is the routing bridge serving as an entry point for the data packet into the TRILL network comprise program instructions to check if the data packet is encapsulated with a TRILL header.

11. The computer program product of claim 9, wherein the stored program instructions further comprise program instructions to receive a TRILL forwarding database containing a virtual local area network (VLAN) ID for each VLAN linked to the TRILL network, the MAC address for each host contained within each VLAN, and the routing bridge linked to each VLAN.

12. The computer program product of claim 11, wherein the program instructions to identify the name of the routing bridge that connects to the destination host for the data packet comprise program instructions to check the TRILL forwarding database to determine the routing bridge that corresponds to the MAC address of the destination host specified in the inner header.

13. The computer program product of claim 9, wherein the program instructions to determine if the routing bridge is the routing bridge that connects to the destination host for the data packet comprise program instructions to compare the name of the routing bridge with the name of the routing bridge that connects to the destination host for the data packet specified in the TRILL header.

14. The computer program product of claim 9, wherein the program instructions to decapsulate comprise program instructions to remove the TRILL header if the routing bridge is the routing bridge serving as the entry point for the data packet into the TRILL network.

15. The computer program product of claim 9, wherein the program instructions to decapsulate comprise program instructions to remove the outer header and the TRILL header if the routing bridge is not the routing bridge serving as the entry point for the data packet into the TRILL network.

16. The computer program product of claim 9, wherein the program instructions to identify the MAC address for the relevant neighboring routing bridge comprise program instructions to cross-reference the routing instructions against the LLDP database.

17. A computer system for static routing in a Transparent Interconnection of Lots of Links (TRILL) network, the computer system comprising:
one or more processors, one or more computer-readable memories, one or more computer-readable storage devices, and program instructions stored on at least one of the one or more computer-readable storage devices for execution by at least one of the one or more processors via at least one of the one or more memories, the stored program instructions comprising:
program instructions to receive location information from one or more neighboring routing bridges of a routing bridge;
program instructions to utilize the received location information to create a Link Layer Discovery Protocol (LLDP) database which includes nicknames and media access control (MAC) addresses for the one or more neighboring routing bridges of the routing bridge;

program instructions to receive routing instructions identifying a neighboring routing bridge of the one or more neighboring routing bridges that corresponds to each routing bridge in the TRILL network that connects to a destination host;

program instructions to receive a data packet with an inner header containing a MAC address of a destination host for the data packet;

program instructions to determine whether a routing bridge is a routing bridge serving as an entry point for the data packet into the TRILL network;

program instructions to, in response to determining the routing bridge is the routing bridge serving as an entry point for the data packet into the TRILL network, utilize a TRILL forwarding database to identify the name of a routing bridge that connects to the destination host for the data packet, and encapsulate the data packet with a TRILL header containing the name of the routing bridge and the name of the routing bridge that connects to the destination host for the data packet;

program instructions to determine whether the routing bridge is the routing bridge that connects to the destination host for the data packet;

program instructions to, in response to determining the routing bridge is the routing bridge that connects to the destination host for the data packet, decapsulate the data packet and forward the data packet to the destination host located at the MAC address specified in the inner header; and program instructions to, in response to determining the routing bridge is not the routing bridge that connects to the destination host for the data packet, utilize the LLDP database and routing instructions to identify the MAC address for a relevant neighboring routing bridge of the one or more neighboring routing bridges, encapsulate the data packet with an outer header containing the MAC address of the routing bridge and the MAC address for the relevant neighboring routing bridge, and send the data packet to the MAC address for the relevant neighboring routing bridge.

18. The computer system of claim 17, wherein the program instructions to determine whether the routing bridge is the routing bridge serving as an entry point for the data packet into the TRILL network comprise program instructions to check if the data packet is encapsulated with a TRILL header.

19. The computer system of claim 17, wherein the stored program instructions further comprise program instructions to receive a TRILL forwarding database containing a virtual local area network (VLAN) ID for each VLAN linked to the TRILL network, the MAC address for each host contained within each VLAN, and the routing bridge linked to each VLAN.

20. The computer system of claim 19, wherein the program instructions to identify the name of the routing bridge that connects to the destination host for the data packet comprise program instructions to check the TRILL forwarding database to determine the routing bridge that corresponds to the MAC address of the destination host specified in the inner header.

21. The computer system of claim 17, wherein the program instructions to determine if the routing bridge is the routing bridge that connects to the destination host for the data packet comprise program instructions to compare the name of the routing bridge with the name of the routing bridge that connects to the destination host for the data packet specified in the TRILL header.

22. The computer system of claim 17, wherein the program instructions to decapsulate comprise program instructions to remove the TRILL header if the routing bridge is the routing bridge serving as the entry point for the data packet into the TRILL network.

23. The computer system of claim 17, wherein the program instructions to decapsulate comprise program instructions to remove the outer header and the TRILL header if the routing bridge is not the routing bridge serving as the entry point for the data packet into the TRILL network.

24. The computer system of claim 17, wherein the program instructions to identify the MAC address for the relevant neighboring routing bridge comprise program instructions to cross-reference the routing instructions against the LLDP database.

* * * * *